(12) United States Patent
Seidel et al.

(10) Patent No.: US 6,389,898 B1
(45) Date of Patent: May 21, 2002

(54) MICROSENSOR WITH A RESONATOR STRUCTURE

(75) Inventors: Helmut Seidel, Starnberg; Matthias Aikele, Unterhaching; Ulrich Prechtel; Oliver Nagler, both of Munich; Karl Kühl, Kaufering, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/424,542
(22) PCT Filed: Mar. 18, 1999
(86) PCT No.: PCT/EP99/01793
 § 371 Date: Feb. 22, 2000
 § 102(e) Date: Feb. 22, 2000
(87) PCT Pub. No.: WO99/49323
 PCT Pub. Date: Sep. 30, 1999

(30) Foreign Application Priority Data

Mar. 24, 1998 (DE) .......................................... 198 12 773

(51) Int. Cl.⁷ .............................................. G01P 15/10
(52) U.S. Cl. .................................. 73/514.29; 73/514.36
(58) Field of Search ........................ 73/514.29, 514.36, 73/514.34, 514.33, 514.16, 514.01

(56) References Cited

U.S. PATENT DOCUMENTS 5,193,392 A * 3/1993 Besson et al. ........... 73/514.29
5,367,217 A   11/1994 Norling

FOREIGN PATENT DOCUMENTS

| | | |
|---|---|---|
| DE | 1 280 998 | 6/1969 |
| DE | 1 572 996 | 5/1970 |
| DE | 40 22 495 | 1/1992 |
| DE | 195 28 961 | 2/1997 |
| WO | WO 89/10567 | 11/1989 |
| WO | WO 89/10568 | 11/1989 |

OTHER PUBLICATIONS

Ohlkers, P. et al "An Integrated Resonant Accelerometer Microsystem for Automotive Applications" Transducers 97, Int'l Conference on Solid State Sensors, Digest of Technical Papers (Cat. No. 97TH8267), Chicago, IL (vol. 2, Jun. 16–19, 1997, pp. 843–846).

* cited by examiner

*Primary Examiner*—Richard A. Moller
(74) *Attorney, Agent, or Firm*—Venable; Norman N. Kunitz

(57) ABSTRACT

A microsensor with a resonator structure, which is excited by first electrical signals to oscillate and emits second electrical signals in dependence on the measuring variable, wherein a heating element, supplied with at least one of the first electrical signals, is arranged on the resonator structure for the thermal excitations of oscillations. For the thermal excitation of lateral oscillations in a microsensor with a resonator structure, the microsensor is provided at one oscillating part of the resonator structure with at least two regions that are thermally separated by a zone with reduced heat conductance, and the heating element is arranged on one of the regions. This type of arrangements permits the excitation of the resonator structure to lateral oscillations if the heating element is supplied with corresponding current pulses. It is advantageous if a receiving element is arranged on at least one of the other regions to detect the oscillation amplitude.

13 Claims, 4 Drawing Sheets

MICROSENSOR WITH A RESONATOR STRUCTURE

BACKGROUND OF THE INVENTION

The invention relates to a microsensor with a resonator structure, which is excited by first electrical signals to oscillate and emits second electrical signals in dependence on the measuring variable, wherein for the thermal excitation of oscillations a heating element is arranged on the resonator structure to which is supplied at least one of the first electrical signals.

An acceleration sensor with a resonator structure that is thermally excited to oscillate is known from "An Integrated Resonant Accelerometer Microsystem for Automotive Applications," Transducer '97, pages 843–846. With this known acceleration sensor, a seismic mass is suspended on two arms in the center of a recess in the silicon chip. The two arms extend diagonal. A resistor is arranged on one of the two arms, which is supplied with a pulsed current. Owing to the thermal stress that changes over time as a result of the temperature differences between the top and the bottom, the structure is excited to oscillations that are adjusted to a resonance requirement by means of an outside wiring. A force exerted onto the seismic mass, for example resulting from an external acceleration perpendicular to the surface of the structure, causes a change in the resonance frequency, which is detected and evaluated.

The thermal excitation by means of current pulses through resistances that are diffused in the surface generates oscillations, for which the oscillation plane is at a right angle to the resonator structure, thereby resulting in a number of disadvantages. In particular, the achievable temperature difference between front and rear side of the heated web is very low, owing to the spatial nearness and the poor thermal insulation. Thus, a relatively high heating output is required. Furthermore, the sensitivity direction of this sensor is perpendicular to its surface. This is not desirable for a plurality of applications, in particular for the use as acceleration sensor for passenger protection systems in motor vehicles. However, for production-technological reasons, vertically oscillating resonators are not very suitable for use as locally sensitive sensors because a different thickness is required, for example, for the resonator and the seismic mass.

SUMMARY OF THE INVENTION

It is the object of the invention to specify a microsensor with a resonator structure, for which a lateral thermal excitation of the oscillations occurs.

This object generally is solved according to the present invention with a microsensor having a resonator structure that is excited by first electrical signals to oscillate and which emits second electrical signals in dependence on a sensed measuring variable, wherein for the thermal excitation of oscillations, a heating element is arranged on the resonator structure, which heating element is supplied with at least one of the first electrical signal, at one base connector point of at least one oscillating segment or portion of the resonator structure, the microsensor has at least two regions that are thermally separated by a zone with reduced heat conductance and the heating element is arranged on one of the two regions, and excites the resonator structure to lateral oscillations. Advantageous embodiments and modifying of the microsensors are disclosed and discussed.

In the case of a microsensor with a resonator structure and thermal excitation of the oscillations, at least two regions that are thermally separated by a zone with decreased heat conductance are provided at one base connection point of at least one oscillating segment of the resonator structure, with the heating element being arranged on one of the region. As a result of this arrangement, lateral oscillations can be excited in the resonator structure if the heating element is provided with corresponding current pulses. It is advantageous if a recording element is arranged at least one of the other regions to detect the oscillation amplitude.

The heating element for one advantageous embodiment of the invention is used simultaneously for the detection of the oscillation amplitude.

A first embodiment of the invention provides that the zone with reduced heat conductance comprises a mechanical recess, which produces an increased thermal insulation between the resulting two regions.

A second embodiment of the invention provides that the oscillating portion of the resonator structure consists of a resonator web, fixed at one or several locations, which changes to a U-profile at its base connections point. In this case, the heating element is arranged on the first leg of the U-profile and the receiving element on the second leg of the U-profile.

In order to sense the measuring variable, it is advantageous if the resonator web is fixed with the end facing away from the U-profile to a sensor-specific structure, which leads to a detuning of the resonance frequency. In the embodiment as acceleration sensor, this is a seismic mass.

Another embodiment of the invention provides that the oscillating part of the resonator structure consists of a tuning fork, having a recess arranged near the base point. This recess provides a thermal insulation between a web that connects the tins of the tuning fork and the base point of the turning fork. The heating element in that case is arranged advantageously on the web.

The resonator structure consists of a semiconductor material, preferably a mono-crystalline silicon. The heating element is designed as doped resistance zone in the silicon material or as thin-film resistor on the surface of the resonator structure.

The receiving element for detecting the oscillation amplitude is designed as piezoresistance. A capacitive detection of the oscillation amplitude is also possible.

DESCRIPTION OF THE PREFERRED EMBODIMENTS

The invention relates to the basic structure of micromechanically produced, thermally activated resonators with a lateral oscillation direction (relative to the chip plane). The idea behind the invention is to be explained with the aid of an acceleration sensor with resonant signal reading and lateral sensitivity direction. However, this is intended to be an exemplary embodiment only and the invention is in no way limited to this embodiment. Further applications for the invention are in the sensor technology field, e.g. for sensing pressure, force, and speed, as well as for the chemical sensor technology, the frequency normal and the filtering technology.

Figure 1:
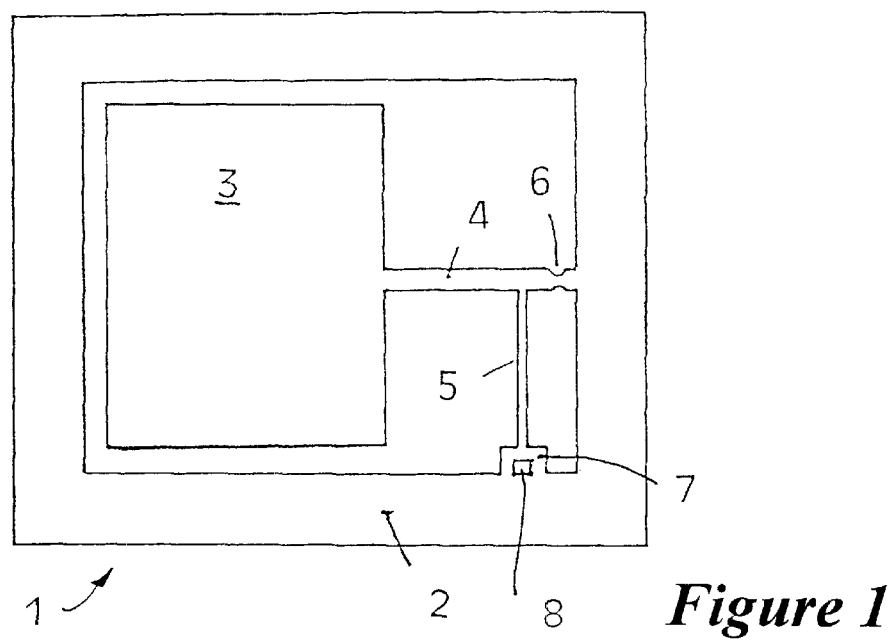
FIG. 1 shows an acceleration sensor according to the invention in a view from above.

The basic resonator structure is characterized in that it has a mechanical recess in or near its base point, which creates an increased thermal insulation between the resulting two mechanical partial regions. FIG. 1 shows a micromechanical acceleration sensor of this type, in particular its resonator structure, in a view from above. The sensor 1 essentially comprises a chip frame 2 and a seismic mass 3, which is positioned such that it can oscillate inside the chip frame and which acts upon the oscillating portion or segment of the resonator structure, the resonator structure, the resonator web 5, by way of a lever 4. Due to the fact that the lever 4 in present exemplary embodiment simultaneously represents the clip frame 2. A U-profile is arranged at the base connection point of the resonator web 5, meaning where the resonator web is connected to the clip frame 2. Its two legs or regions are connected here to the clip frame 2 and the resonator web 5 is connected to the center of the crossbeam of the U-profile.

In the concrete case of the acceleration sensor, the two legs are two regions that are thermally separated by the recess 8 of the U-profile. The recess 8 forms a zone with reduced heat conductance.

Figure 2:
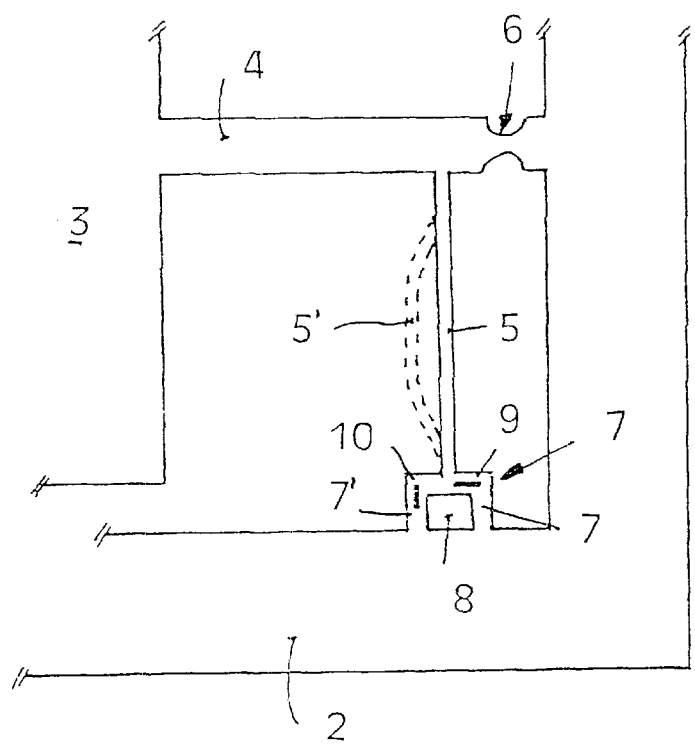
FIG. 2 shows a detail of the acceleration sensor in FIG. 1.
Figure 3:
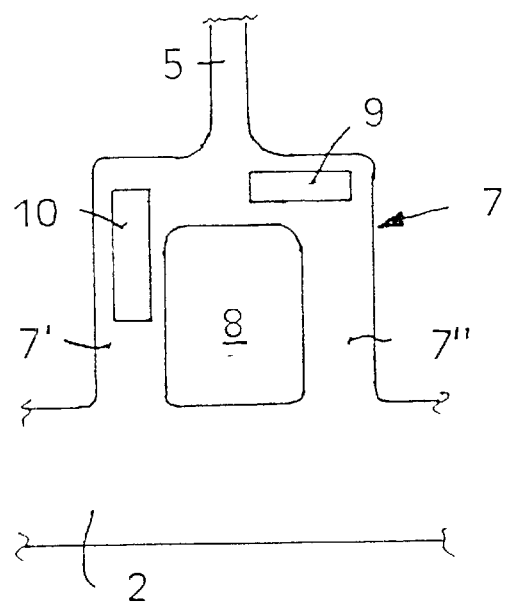
FIG. 3 shows a further detail of the acceleration sensor in FIG. 1.

FIG. 2 provides a detailed view of this portion of the resonator structure. A resistor 10 is deposited on one of two region as a heating element and a receiving element a for detecting the oscillation amplitude is deposited on the other of the two regions. The receiving element a in the present exemplary embodiment is a piezoresistance. However, other and for example capacitive, receiving elements can be used advantageously for this. The oscillation place for the resonator web 5 is in the plane for the resonator structure, i.e., lattered and is indicated in FIG. 2 with the dashed lines showing the deflection position 5' for the resonator web 5. A periodic excitation of the heating element 10 by a pulsed current will lead to a thermal deformation of this leg in the excitation cycle. The resonator web 5 is excited and starts oscillating at the same time. FIG. 3 shows the U-profile 7 once more in an enlarged representation.

Another option is to respectively deposit one heating element on both partial structures and to activate both in the push-pull mode. The receiving elements must then be repositioned accordingly.

In the simplest case, the heating resistance 10 is realized by re-doping a zone in the semiconductor material of the resonator structure. The advantage in this case is a very easy production, as well as the fact that no unnecessary temperature drifts are induced (e.g. as for the bimetals). However, it is also possible to deposit a thin-film heating resistance at the respective location on the resonator structure.

In the simplest case, the oscillation amplitude can be detected via a piezoresistance as the receiving element 9. If acceleration acts upon the seismic mass 3, the resonant frequency of the resonator web 5 will also change as a result of the change in the mechanical fixation of the resonator web 5, owing to the effect of the lever 4. The output signal from the microsensor is the resonance frequency that is proportional to the acceleration, which is determined by means of a suitable electronic circuit that comprises the heating element and the receiving element.

Figure 5:
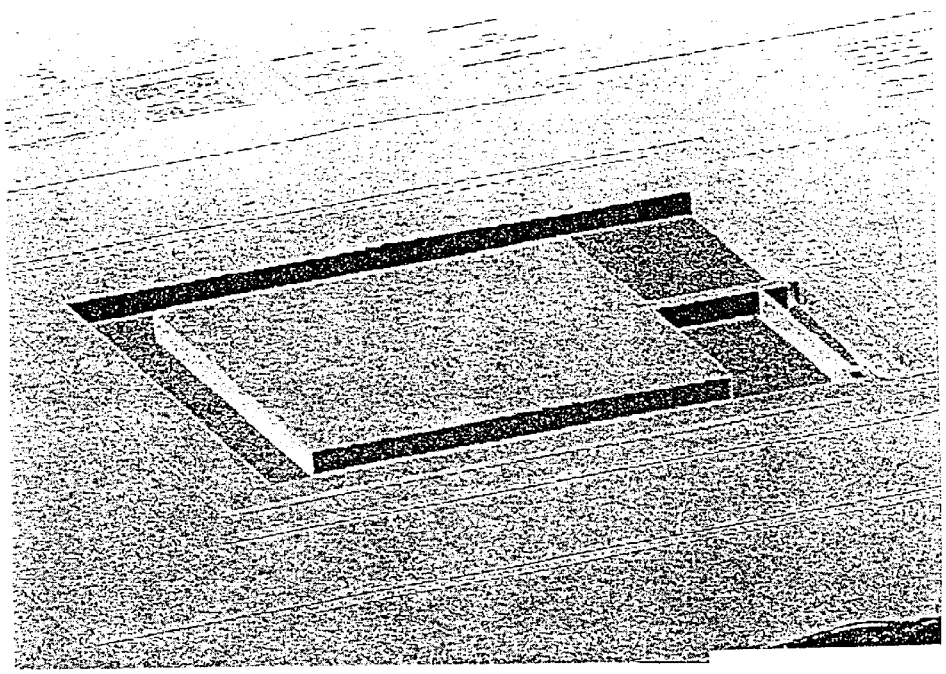
FIG. 5 shows the acceleration sensor in FIG. 1, in a perspective view.
Figure 6:
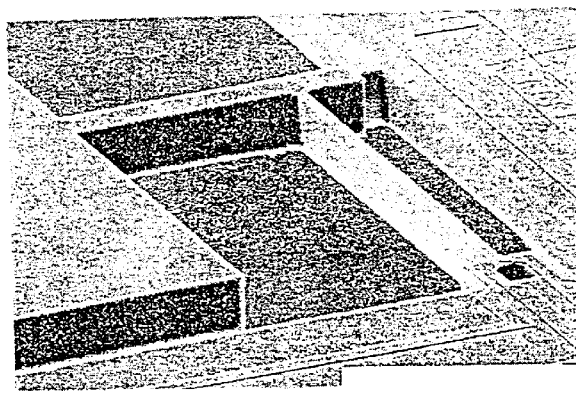
FIG. 6 shows a sectional detail of FIG. 2, in a perspective view.
Figure 7:
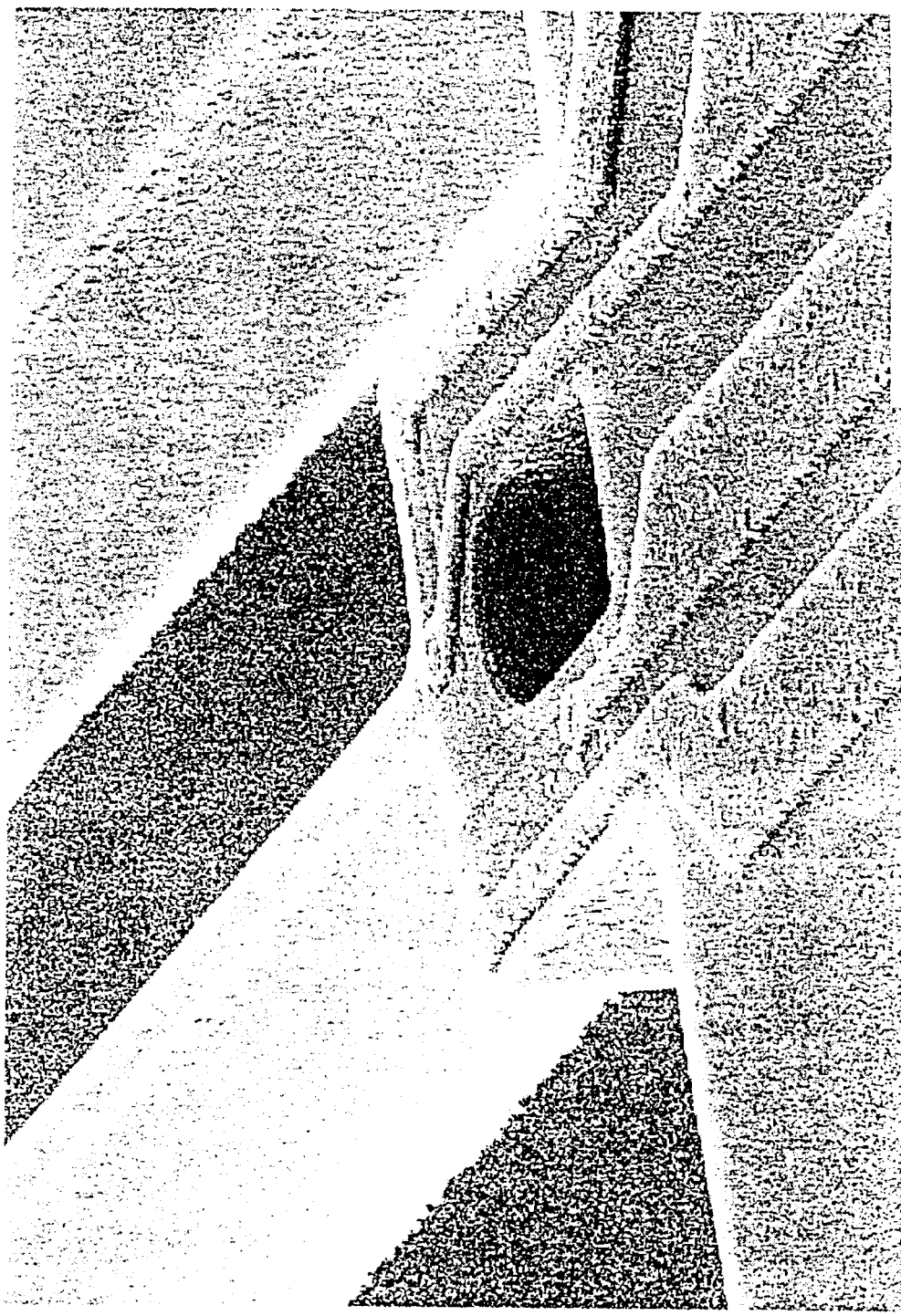
FIG. 7 shows a sectional detail of FIG. 3 in a perspective view.

The FIGS. 5, 6 and 7 again show a perspective view of the microsensor in the respective detailed views according to FIGS. 1, 2 and 3. The electrical feed lines for the heating element and the receiving element are also shown therein.

Figure 4:
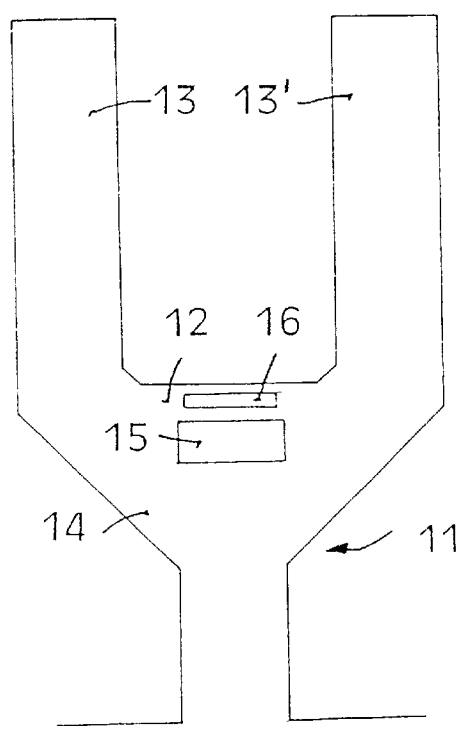
FIG. 4 shows a tuning fork resonator according to the invention.

A tuning fork structure for measuring rotational speeds is shown in FIG. 4 as a second exemplary embodiment. A mechanical connecting web 12 is realized there between the two tins 13, 13', which is separated from the base connection point 14 of the tuning fork tins by a mechanical recess 15. The heating resistance 16 is located on this connecting web 12. The push-pull mode of the tuning fork is excited with this geometry, which mode is necessary for measuring the rotational speed by means of the Coriolis force. Capacitive measuring electrodes or piezoresistances, which are not shown in the Figure for reasons of clarity, can be used to read the amplitude. If necessary, the person skilled in the art can adjust these based on the sensor requirements and can place them accordingly on the surface.

Another example involves a pressure sensor for very low pressures (<10 mbar), in particular for the vacuum technology. A simple resonator web can be used for this. The resonant rise or the quality of the resonant frequency, which depends strongly on the environmental pressure, is used as measuring variable. The sensor can be adapted to the desired pressure range through a corresponding selection of the oscillating masses or the cross-sectional surfaces.

Another exemplary embodiment is a simple frequency normal for micro-electronic circuits, corresponding to an oscillator crystal. The resonator structure can be operated without problems in the range of several 100 kHz, up to the MHz range. Owing to its simple design, it is possible to integrate the resonator directly into an IC (integrated circuit) and thus avoid the necessity of oscillating crystals.

What is claimed is:

1. A microsensor having: a resonator structure that is excited by first electrical signals to oscillate and which emits second electrical signals in dependence on a sensed measurement variable, and wherein: for a thermal excitation of oscillations, a heating element is arranged on the resonator structure, which heating element is supplied with at least one of the first electrical signals; at one base connection of at least one oscillating segment of the resonator structure, the oscillating segment has at least two regions that are thermally separated by a zone with reduced heat conductance; and the heating element is arranged on one of the two regions and excites the resonator structure to lateral oscillations.

2. A microsensor with a resonator structure according to claim 1, wherein a receiving element for detecting the oscillation amplitude is arranged on at least one of the other of the two regions.

3. A microsensor with a resonator structure according to claim 1, wherein the zone with reduced heat conductance contains a mechanical recess, which creates an increased thermal insulation between the resulting two regions.

4. A microsensor with a resonator structure according to claim 1, wherein the resonator structure is composed of mono-crystalline silicon and the heating element is a doped resistance zone in the silicon material.

5. A microsensor with a resonator structure according to claim 1, wherein the heating element is a thin-film resistor on the surface of the resonator structure.

6. A microsensor with a resonator structure according to claim 1, wherein the oscillating segment of the resonator structure consists of a resonator web that is fixed at one or several locations and changes into a U-profile at its base connection point, wherein the heating element is located on a first leg of the U-profile and the receiving element is located on a second leg of the U-profile.

7. A microsensor with a resonator structure according to claim 6, wherein the resonator web is fixed at the end facing away from the U-profile to a sensor-specific structure, which leads to a detuning of the resonance frequency of the said resonant structure.

8. A microsensor with a resonator structure according to claim 7, wherein the sensor-specific structure for detuning the resonance frequency is a seismic mass.

9. A microsensor with a resonator structure according to claim 1, wherein the oscillating segment of the resonator structure consists of a tuning fork, provided with a recess near the base connection point of the tins, which recess thermally insulates a web that joins the tins of the tuning fork from the base connection point.

10. A microsensor with a resonator structure according to claim 9, wherein the heating element is arranged on the web.

11. A microsensor with a resonator structure according to claim 1, wherein a resonator structure consists of a monocrystalline silicon.

12. A microsensor with a resonator structure according to claim 2, wherein the receiving element is a piezoresistance to detect the oscillation amplitude.

13. A microsensor with a resonator structure according to claim 1, wherein a capacitive sensor for detection of the oscillation amplitude is provided.

* * * * *